United States Patent [19]
Patterson

[11] 3,830,200
[45] Aug. 20, 1974

[54] RESEARCH CAGE APPARATUS WITH IMPROVED FILTER CLAMPING MEANS

[75] Inventor: Carol M. Patterson, Bryan, Tex.

[73] Assignee: Research Equipment Company, Inc., Bryan, Tex.

[22] Filed: Jan. 19, 1973

[21] Appl. No.: 325,100

[52] U.S. Cl.............................. 119/15, 119/17
[51] Int. Cl............................... A01k 01/00
[58] Field of Search............ 119/15, 18, 17; 128/1 B

[56] References Cited
UNITED STATES PATENTS
| | | | |
|---|---|---|---|
| 3,304,913 | 2/1967 | Nesher | 119/15 |
| 3,456,618 | 7/1969 | Barlow | 119/18 |

Primary Examiner—Hugh R. Chamblee
Attorney, Agent, or Firm—Pravel, Wilson & Matthews

[57] ABSTRACT

A multi-unit animal cage apparatus for housing small animals such as rodents under controlled environmental conditions, including a rack formed of vertical frame members interconnected by front, rear and opposing side frame members, suspensory rails being mounted under the front and rear frame members for slidably receiving cage-drawers; and, a support screen mounted onto the front and rear frame members and the suspensory flanges to receive and support a filter material that is held in place by releasable clamping means attached with the front, rear, and opposing side members.

8 Claims, 3 Drawing Figures

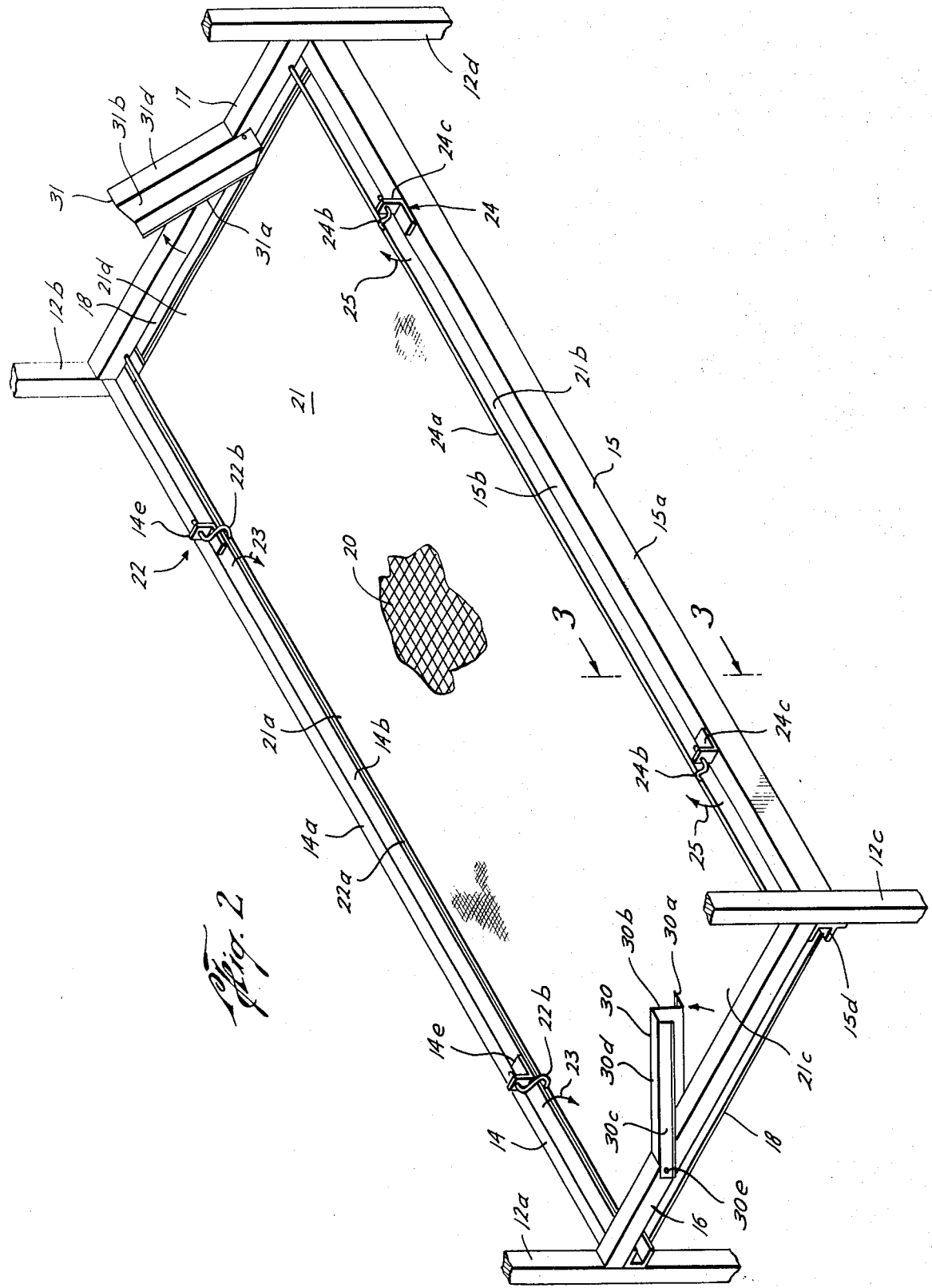

RESEARCH CAGE APPARATUS WITH IMPROVED FILTER CLAMPING MEANS

BACKGROUND OF THE INVENTION

The field of this invention is research animal caging.

In conducting animal research on small animals such as mice, hamsters, guinea pigs, rats and gerbils, it is desirable to maintain the animals in an environment as free of contagion as possible. It is further desired to house the small animals in single, compact, multi-unit cages, such as that disclosed in U.S. Pat. No. 3,456,618 issued to Barlow, which discloses a multi-unit cage including a rack which supports a plurality of slidably-mounted cage-drawers.

It is also very important in using such multi-unit cages to prevent the transfer of contagion from one cage-drawer to another. In order to prevent such transfers of contagion, multi-unit cages have been produced wherein wire mesh was mounted onto the frame members of the rack immediately above the cage-drawers with filter material positioned over the wire mesh. In such multi-unit cages, the filter material was held in place by separate spring members that were not connected to the cage. These spring members were unsatisfactory in that they did not uniformly clamp the edges of the filter material against the wire mesh and further, that the spring members were sometimes lost or misplaced.

SUMMARY OF THE INVENTION

It is an object of this invention to provide a new and improved multi-unit cage apparatus for housing small animals such as rodents in a plurality of individual cage-drawers suspended from a rack wherein the environment within each individual cage is effectively controlled by use of filter material mounted above the cage-drawers. In the preferred embodiment of this invention, an improved multi-unit caging apparatus includes a rack having vertical frame members interconnected by front, rear and opposing side frame members. Suspensory flanges are mounted below the front and rear frame members to slidably receive cage-drawers for actually housing the animals. A support screen is attached to the front and rear frame members and to the suspensory flanges to provide a support screen to receive a filter material. The filter material is firmly clamped onto the support screen by releasable clamping means, which are permanently connected to the front, rear and opposing side frame members, for firmly clamping the filter material against the support screen to minimize the entrance of any contagion into the individual cage-drawers.

In the preferred embodiment of this invention, the releasable clamping means includes longitudinally extending rods which are pivotally mounted to the front and rear frame members to clamp the filter material against the support screen. Further, clamping bars are provided at the sides of the rack and are pivotally mounted to the side frame members for movement to a clamped position against the support screen whereby substantially the complete edge of the filter material is firmly and positively held in position against the support screen, thus minimizing the transfer of contagion from one cage-drawer to another.

BRIEF DESCRIPTION OF THE DRAWINGS

FIG. 2 is a rear isometric view of the multi-unit caging apparatus illustrating the various positions of the filter clamping means.

DESCRIPTION OF THE PREFERRED EMBODIMENT

Figure 1:
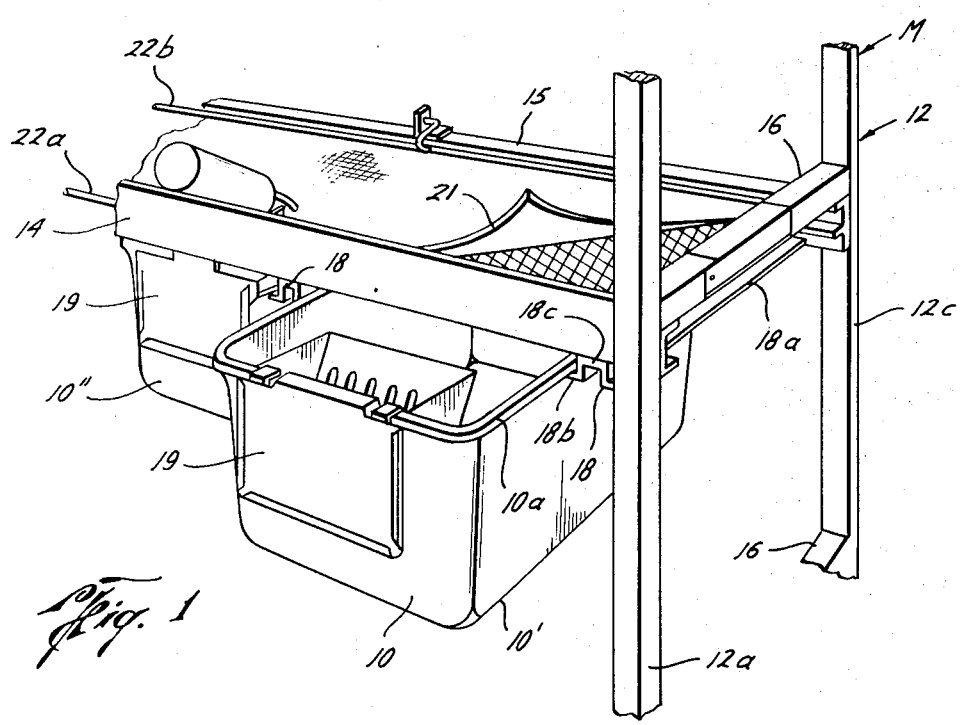
FIG. 1 is a front isometric view of a portion of a single row of a multi-unit caging apparatus illustrating the position of the filter material with respect to individual cage-drawers.

Referring to the drawings, the letter M generally designates a multi-unit caging apparatus for housing rodents or other small animals under conditions which minimize fomite dispersion and other transfer of contagion into individual cage-drawers numbered 10. The multi-unit caging apparatus M includes a rack or frame generally designated as 12 which includes front vertical frame members 12a and 12b and rear vertical frame members 12c and 12d. The front vertical frame members 12a and 12b are interconnected by front horizontal frame members such as 14 and the rear vertical frame members 12c and 12d are interconnected by rear horizontal frame members such as 15. The front vertical frame member 12a is connected with the rear vertical frame member 12c by horizontal side frame member 16 which is mounted directly above the front and rear frame members 14 and 15, respectively. Similarly, the front vertical frame member 12b is connected to the rear vertical frame 12d by horizontal side frame member 17 which is connected above front and rear frame members 14 and 15, respectively. It should be noted that in the preferred embodiment of this invention, all of the frame members such as the vertical frame members 12 and the horizontal frame members 14–17 are made of stainless steel or aluminum and are interconnected by welding or other suitable means.

The cross-sectional configuration of the various frame members can be varied as desired. In the preferred embodiment of this invention, the vertical frame members 12 and the horizontal side frame members 16 and 17 are square tubular members.

Figure 3:
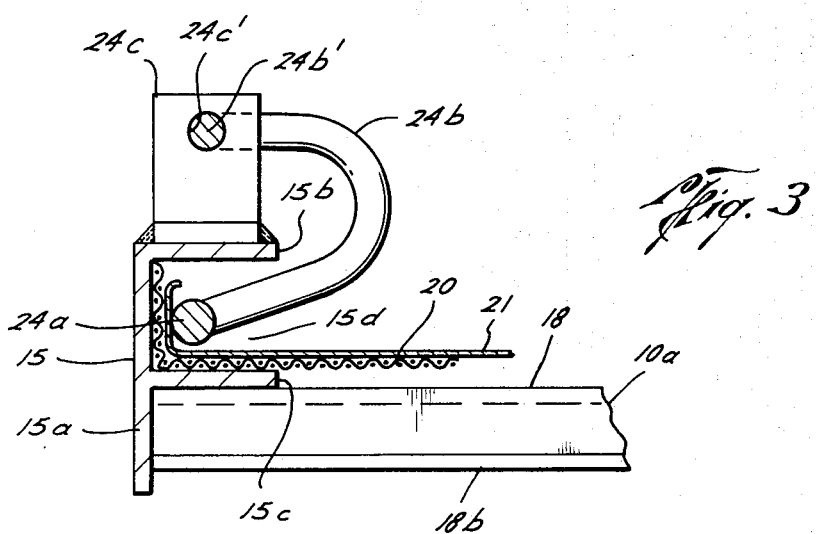
FIG. 3 is a sectional view taken along lines 3—3 of FIG. 2 illustrating the clamping rod in a clamped position.

Referring to FIG. 3, the rear horizontal frame member 15 has the general shape of an "F" including a vertical back portion 15a, an upper ledge 15b and an intermediate ledge 15c. The longitudinal area defined by the ledges 15b and 15c and the back wall 15a is generally designated as recessed area 15d. The front horizontal frame member 14 is the same type of frame member in configuration, that is, the "F" configuration, as the rear horizontal frame member, except that the front horizontal frame member 14 is inverted. The front horizontal frame member 14 includes a front wall, 14a, and intermediate ledge 14b, and a lower ledge 14c. The intermediate and lower ledges define a recessed longitudinal area 14d.

Suspensory flanges 18 are mounted to the underside of the lower ledge 14c of the front horizontal member 14 and to the underside of the intermediate ledge 15c of the horizontal rear frame member 15. These suspensory flanges 18 are spaced a sufficient distance apart to receive and suspend the individual cage-drawers 10. The cross-sectional configuration of the suspensory flanges 18 is generally U-shaped and includes horizontal ledges or wings 18a and 18b for receiving the cage-drawers 10.

The cage-drawers 10 are merely representative of the plurality of individual cage-drawers which are mounted in rows in the multi-unit cage apparatus. Each of the cage-drawers 10 are molded polycarbonate and include upper rim portions such as 10a which extend entirely about the cage-drawer and are adapted to engage the upper surface of the suspensory flange ledges 18a or 18b. In this manner, a cage-drawer 10 is slidably mounted on the horizontal ledges 18a and 18b of the spaced suspensory flanges 18. The cage-drawers 10 can be moved between an exposed position indicated at 10' and the caged position indicated at 10''. In this manner, the animal contained in the polycarbonate cage 10 is easily available to the researcher simply by sliding the cage-drawers 10 outwardly of the suspensory flanges 18. A combination cardholder and feed hopper 19 is mounted over the front wall 10a of the cage-drawers 10 for holding food for the animal inside the cage and for holding an identification card on the outside of the cage drawer.

As mentioned previously, one of the very great problems with caging small animals so closely together is the possibility of the transfer by fomite of contagion from one cage-drawer such as 10 to another cage drawer. It is possible that each individual cage-drawer have a filter plate on top of it; however, this tends to be very expensive, both in terms of a material and in terms of the individual handling of the cage-drawers. In the embodiment of this invention, illustrated in the drawings, a support screen of wire mesh 20 is mounted immediately above the cage-drawers 10 on the suspensory flanges 18 and the front and rear horizontal frame member 14 and 15. The wire mesh 20 is welded or otherwise attached to the intermediate ledge 15c and to the rear wall 15a of the rear horizontal frame member 15 in the defined recessed longitudinal area 15d. Similarly, the wire mesh 20 is welded or otherwise attached within the longitudinal recessed area 14d of the front horizontal frame member 14 by welding or otherwise attaching the wire mesh to the lower ledge 14c and to the front wall 14a of the front horizontal frame member 14. The wire mesh is welded or otherwise attached to the top 18c of the suspensory flanges 18 which are positioned nearest to the vertical frame members such as 12a and 12c and 12b and 12d. Thus the wire mesh 20 is firmly supported on the front and rear horizontal frame members 14 and 15 and onto the end suspensory flanges 18 in order to provide a support screen for supporting a filter material 21.

The filter material 21 is rectangular in configuration to generally fit the configuration formed by the wire mesh 20 which in turn, of course, fits the configuration of the horizontal frame members 14–17. The filter material 21 may be any suitable filter material which will prevent the passage of contagion from the environment into the individual cage-drawers 10. One such filter material is a spun-bonded filter material produced by E. I. DuPont de Nemours & Co. The filter material 21 is thus provided in the same rectangular shape as the wire mesh 20 and has substantially the same dimensions so that the filter material can be positioned onto the wire mesh 20 and into the recessed portion 15d of the rear horizontal frame member 15 and into the recessed portion 14d of the front horizontal frame member 14.

Releasable clamp means generally designated as 22 are mounted onto the front horizontal frame member 14 in order to clamp the front edge 21a of the filter material 21 against the wire mesh 20. The releasable clamp means 22 includes a longitudinally extending rod 22a which extends substantially the entire length of the front horizontal frame member 14. The rod 22a is welded or otherwise attached to two generally S-shaped rod portions 22b. Each of the rod portions 22b is mounted onto an L-shaped support 14e which is welded or otherwise attached to the upper surface of the intermediate ledge 14b of the front horizontal frame member 14. The curved rod portions 22b are pivotally mounted in the supports 14e thereby pivotally mounting the longitudinal rod 14 for pivotal movement between a clamp position wherein the longitudinal rod portion 14 is positioned against the filter material in the longitudinal recess 14d and a release position out of such recessed area 14d. The front edge 21a of the filter material 21 is clamped against the wire mesh 20 by swinging or pivoting the longitudinal rod 22a on curved rod portions 22b in the direction of the arrows 23 into the recessed area 14d against the front filter material edge 21a positioned therein.

A releasable clamping means 24 similar to the releasable clamping means 22 is mounted onto the rear horizontal frame member 15. A longitudinally extending rod 24a extends longitudinally substantially the length of the rear horizontal frame member 15. The longitudinal rod 24a is pivotally connected for movement between the clamp position illustrated in FIG. 3 and the release position illustrated in FIG. 2. The longitudinal rod 24a is pivotally mounted to the L-shaped supports 24c by the S-shaped rod portions 24b which are welded onto the longitudinal rod portion 24a. The "S" or curved rod portions 24b pivotally mount onto the L-shaped supports 24c, which are welded or otherwise attached to the upper surface of the upper ledge 15b of the rear horizontal frame member 15. The pivotal connection between the curved rod portion 24b and the L-shaped supports 24c is provided by simply extending a portion 24b' of the curved rod 24b through an opening 24c' in the L-shaped support 24c. A similar pivotal connection is provided between the curved rod portion 22b of the releasable clamping means 22 and the L-shaped supports 14e mounted on the front horizontal frame member 14.

As mentioned previously, the longitudinal rod 24a is movable to a release position as shown in FIG. 2, wherein the filter material 21 may be removed or replaced as desired. When placing the filter material 21 in position onto the wire mesh 20, the rear edge 21d of the filter material 21 is positioned into the longitudinal recessed area 15d of the rear horizontal frame member 15, against the wire mesh 20 welded therein. The longitudinal rod 24a is then pivoted downwardly into the recessed portion 15d against the rear filter material edge 21d in order to press and hold the filter material 21 against the wire mesh 20 and the rear horizontal frame wall 15a. The longitudinal rod 24a is pivoted to the release position simply by moving it outwardly in the direction of arrows 24 as illustrated in FIG. 2.

A side clamp bar 30 is pivotally connected to side frame member 16 for clamping side edge 21c of the filter material 21 down against the wire mesh 20 attached to the suspensory channel 18 positioned nearest to frame members 12a and 12c. The clamping bar 30 includes a clamping face 30a and side faces 30b and 30c integrally connected to a top 30d. The clamping bar 30 is pivotally connected to the side frame member 16 by any suitable pin 30e. The clamping bar 30 is movable between the release position illustrated in FIG. 2 and a clamped position wherein the clamping bar is pushed down over the horizontal frame member 16 and the clamping face 30a engages the presses against the filter material edge 21c thereby holding the filter material against the wire mesh 20. The distance between the walls 30b and 30c of the clamping bar 30 is slightly less than the width of the horizontal frame 16 such that the clamping bar walls 30b and 30c yieldably engage the horizontal frame member 16 thereby holding the clamping bar in the clamped position.

A clamping bar 31 is pivotally mounted onto the horizontal side frame member 17 for clamping filter material edge 21d down against the wire mesh 20. The clamping bar 31 is identical in cross-sectional configuration to the clamping bar 30. The clamping bar 31 includes a clamping face 31a and a side face 31b integrally connected with top portion 31d, which is integrally connected with another side portion (not shown). The two side walls or portions have a distance between them slightly less than the width of the horizontal side frame member 17 such that, whenever the clamping bar is moved downwardly onto the frame member 17, it is firmly held in the clamped position. In the clamped position, the face 31a engages the side 21d of the filter material 21 thereby clamping the filter material against the wire mesh.

In operation and use of the multi-unit caging apparatus M of the preferred embodiment of this invention, a plurality of cage-drawers such as 10 are slidably mounted in the suspensory channels 18 and animals such as mice, hamsters, guinea pigs, rats or gerbils are caged therein. Such animals are exposed to experimental diseases in order to gain scientific data upon the effect of such diseases; and, in order to obtain the most accurate results, transfer of contagion through the air from one cage-drawer to another is minimized. A suitable filter material 21 such as that described herein is placed over the wire mesh 20 and the front edge 21a and the rear edge 21b are clamped by moving clamping rods 22a and 24a, respectively, to a clamped position against the wire mesh 20. Similarly, the sides 21c and 21d of the filter material are clamped down against the wire mesh by moving the clamping bars 30 and 31 downwardly such that the clamping faces 30a and 31a engage the filter material and press the filter material against the wire mesh 20. In this manner, substantially the entire edge of the rectangularly-shaped filter material 21 is held in position against the wire mesh thereby preventing the formation of air pockets or air holes which would allow the entry of unfiltered air into one or more of the cage-drawers 10. The providing of such a controlled environment for animal research reduces infantile diarrhea in such animals as well as the possibility of respiratory infection.

Whenever it is desirable to replace the filter material 21, the longitudinal rods 22a and 24a and the clamping bars 30 and 31 are pivoted outward to the release position out of engagement with the filter material 21 so that the filter material can be easily removed and a new or washed rectangular piece of filter material may be positioned over and clamped to the wire mesh as heretofore described.

The foregoing disclosure and description of the invention are illustrative and explanatory thereof, and various changes in the size, shape, and materials as well as in the details of the illustrated construction may be made without departing from the spirit of the invention.

What is claimed is:

1. An improved multi-unit animal caging system, comprising:
   a rack including vertical frame members interconnected by front, rear and opposing side frame members;
   suspensory flanges mounted with said front and rear frame members, said suspensory flanges being adapted to slidably receive cage-drawers for housing animals;
   a support screen attached to said front and rear frame members and to said suspensory flanges to form a support surface above said cage-drawers;
   a filter material positioned on said support screen; and
   releasable clamping means connected to said front and rear frame members for movement between a released position and a clamped position, in which said filter material is clamped against said support screen by said clamping means to minimize the transfer of contagion into said cage-drawers.

2. The structure set forth in claim 1, wherein said releasable clamping means includes:
   a clamp rod extending longitudinally of said front frame member; and
   rod connection means pivotally connecting said clamp rod to said front frame member for moving said clamp rod to a clamped position against said front frame member with said filter material clamped therebetween.

3. The structure set forth in claim 2, wherein:
   said front frame member includes a recessed portion in which said support screen is mounted;
   said filter material is positioned in said recessed portion; and
   said clamp rod in said clamped position engages said filter material in said recessed portion.

4. The structure set forth in claim 2, wherein said rod connection means includes:
   a curved rod portion attached to said clamp rod and pivotally attached to said front frame member.

5. The structure set forth in claim 2, wherein:
   said clamp rod is movable to a released position so that said filter material can be easily removed or replaced.

6. The structure set forth in claim 1, including:
   a clamp bar;
   connecting means pivotally mounting said clamp bar to an opposing side frame member for movement between a released position and a clamped position wherein said clamp bar engages and holds said filter material against said support screen.

7. The structure set forth in claim 6, including:
   said clamp bar including opposing sides that releasably engage said opposing side frame member with said clamp bar in said clamped position to hold said clamp bar in engagement with said filter material.

8. The structure set forth in claim 1, wherein:
   said releasable clamping means includes clamp rods pivotally mounted by rod connection means to said front and rear frame members for clamping opposing ends of said filter material against said support screen; and clamp bars pivotally mounted by bar connection means to each of said opposing side frame members for clamping opposing ends of said filter material against said support screen.

* * * * *